(12) United States Patent
Rapoport et al.

(10) Patent No.: US 9,092,908 B2
(45) Date of Patent: Jul. 28, 2015

(54) SHARING PHOTO ALBUMS IN THREE DIMENSIONAL ENVIRONMENTS

(75) Inventors: Evan D. Rapoport, Los Altos, CA (US); Kei Kawai, Mountain View, CA (US); Luc Vincent, Palo Alto, CA (US); Chase Hensel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/548,979

(22) Filed: Jul. 13, 2012

(65) Prior Publication Data

US 2014/0015827 A1    Jan. 16, 2014

(51) Int. Cl.
*G06T 11/60* (2006.01)
*G06T 17/05* (2011.01)
*G06T 19/00* (2011.01)
*G06Q 50/00* (2012.01)

(52) U.S. Cl.
CPC .............. *G06T 11/60* (2013.01); *G06Q 50/01* (2013.01); *G06T 17/05* (2013.01); *G06T 19/003* (2013.01)

(58) Field of Classification Search
CPC ........... G06T 15/00; G06F 17/30; H04N 7/00
See application file for complete search history.

(56) References Cited

U.S. PATENT DOCUMENTS

| | | | |
|---|---|---|---|
| 7,046,927 | B2 | 5/2006 | Dalton et al. |
| 8,026,929 | B2 | 9/2011 | Naimark |
| 2003/0182210 | A1 | 9/2003 | Weitzman et al. |
| 2004/0218910 | A1 | 11/2004 | Chang et al. |
| 2005/0268245 | A1* | 12/2005 | Gipps et al. ................... 715/762 |
| 2009/0135178 | A1* | 5/2009 | Aihara et al. ................. 345/419 |
| 2009/0254843 | A1* | 10/2009 | Van Wie et al. .............. 715/757 |
| 2010/0008255 | A1* | 1/2010 | Khosravy et al. ............. 370/254 |
| 2010/0191728 | A1* | 7/2010 | Reilly et al. .................. 707/736 |
| 2011/0301760 | A1* | 12/2011 | Shuster et al. ................ 700/264 |
| 2012/0033032 | A1 | 2/2012 | Kankainen |

OTHER PUBLICATIONS

International Search Report directed to related International Application No. PCT/US13/49913, mailed on Sep. 18, 2013; 4 pages.
Written Opinion directed to related International Application No. PCT/US13/49913, mailed on Sep. 18, 2013; 10 pages.

* cited by examiner

*Primary Examiner* — Edward Martello
(74) *Attorney, Agent, or Firm* — Lerner, David, Littenberg, Krumholz & Mentlik, LLP (57) ABSTRACT

Embodiments of the invention include a system, method and computer-readable medium for viewing images in a three-dimensional environment. A user is identified. A social graph of the identified user and a plurality of other users is accessed. Based on the social graph, a plurality of images associated with one or more of the other users in the social graph are determined. The plurality of images and data are provided to a client device, wherein the data enables the display of the images in the 3D environment, at the client device.

16 Claims, 10 Drawing Sheets

SHARING PHOTO ALBUMS IN THREE DIMENSIONAL ENVIRONMENTS

BACKGROUND

Today's technology allows a person travelling to different locations around the world to take photographs with a camera or a portable computing device, such as a cellular phone. The person can upload those photographs to a computer. Once on the computer, a person is able to share those photographs. One way of sharing the photographs is to email the photographs from the computer to a group of individuals.

Another way to share the photographs is to, for example, upload the photographs directly to a server accessible via a network such as the Internet. For example, when a photograph is taken using a camera on a cellular phone, or another electronic device that has network access, the person can upload the photograph to a server using the network. Yet another way to share photographs is to upload the photographs to a server, using, for example, a web browser and Internet.

Once the photographs are on the central server, the person may opt to control the access to the photographs by other individuals. A typical way of controlling the access is by password protecting the photographs.

A person is able to distribute the location of photographs on a central server using, for example, an email that includes an address of the server. Typically, the person may access an email account and generate an email to one or more individuals who the person wishes to view the photographs. The email may include a uniform resource locator ("URL") that is associated with the uploaded photographs on the central server. Alternatively, a person may orally communicate the URL to one or more individuals or send the URL in a text message.

An individual receiving such a URL is able to access the photographs uploaded to the central server. For example, the individual is able to click and view the individual photographs or initiate a slide show that shows the photographs one after the other. If the individual has a password set by the owner of the photographs, the individual is able to view the password protected pictures as well.

BRIEF SUMMARY

Embodiments of the invention include a system, method and computer-readable medium for viewing images in a three-dimensional environment. A user is identified. A social graph of the identified user and a plurality of other users is accessed. Based on the social graph, a plurality of images associated with one or more of the other users in the social graph are determined. The plurality of images and data are provided to a client device, wherein the data enables the display of the images in the 3D environment, at the client device.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

INTRODUCTION

FIGS. 1A-D illustrate embodiments in which one or more images are included in a three dimensional environment of a three dimensional photo album. As described below, a three-dimensional (3D) album can include one or more 3D environments. Each 3D environment may include 3D models that are comprised of multiple two-dimensional (2D) images or 360 degree panoramas that are stitched together. The 3D models may represent locations around the world.

A user using a client device may generate and view 3D albums. To generate a 3D album, the user selects one or more 2D images, such as photographs, and inserts each 2D image into one or more 3D environments in the 3D album. In an embodiment, to insert the 2D image, the real-world location included in the image is identified. Based on the identified real-world location, a pre-generated 3D environment may be selected that includes the same real-world location. In an embodiment, the real-world location may be denoted using longitudinal and longitudinal coordinates. The 2D image is then merged into the 3D environment, and in an embodiment, may be superimposed over an existing 2D image in the 3D environment that has the same or similar longitudinal and latitudinal coordinates.

Figure 1A:
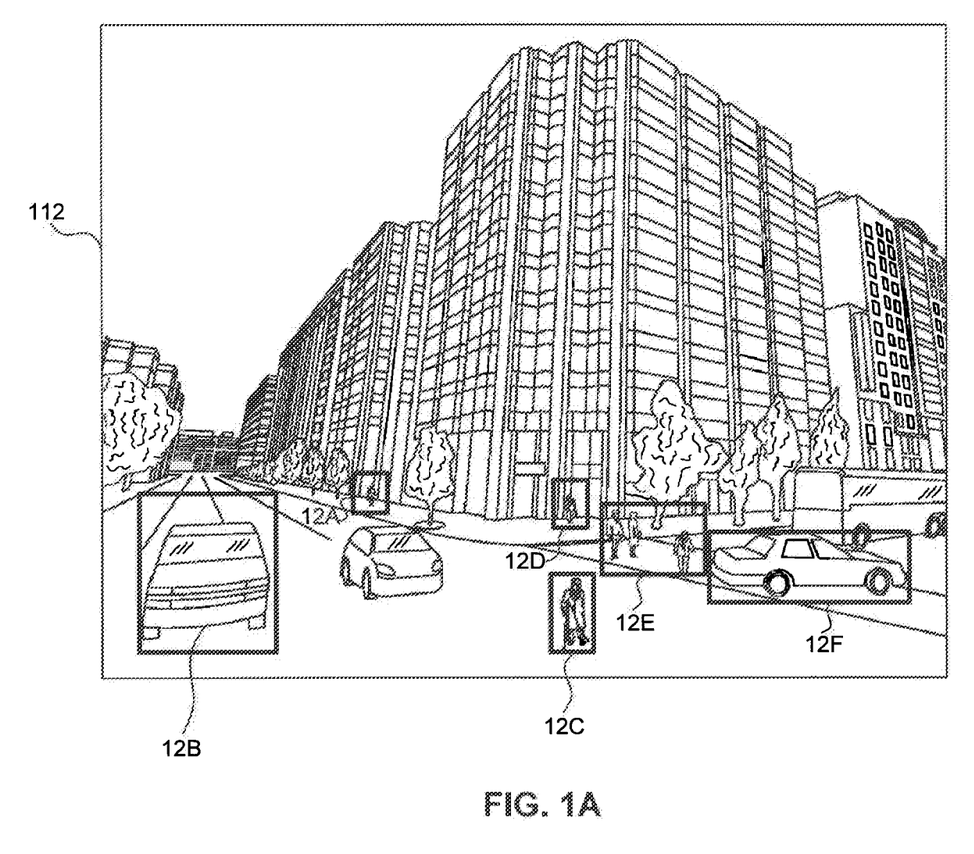
FIG. 1A-D are screen-shots of one of the 3D images in a three-dimensional album, according to an embodiment.

FIG. 1A is a screenshot of a 3D environment in a 3D album. In FIG. 1A, a user includes multiple photographs 12A-F into a 3D environment of a street in Washington, D.C. Photographs 12A-F, for example, could have been taken by a user using a camera or a mobile device while in Washington, D.C.

Figure 1B:
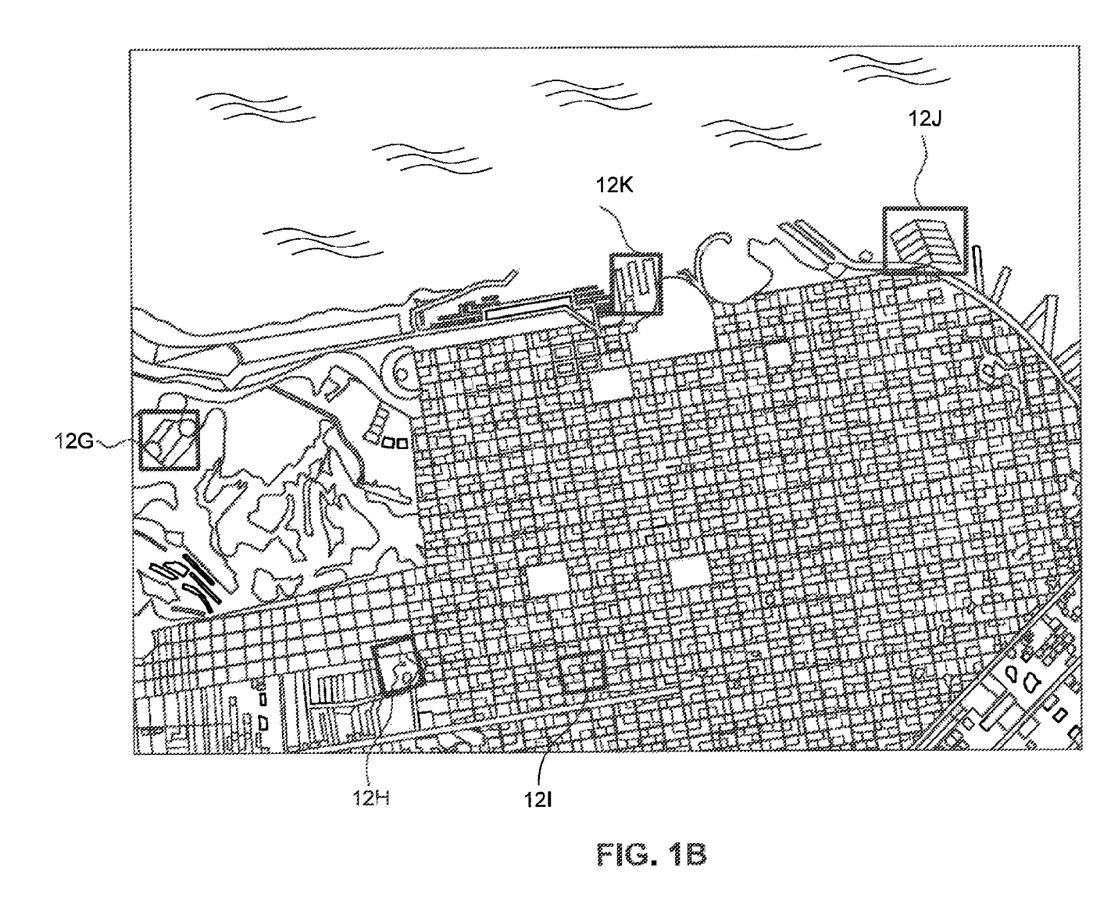

FIG. 1B is a screenshot of a 3D environment in a 3D album from a satellite perspective. FIG. 1B includes photographs 12G-K of a 3D environment in San Francisco, Calif.

Figure 1C:
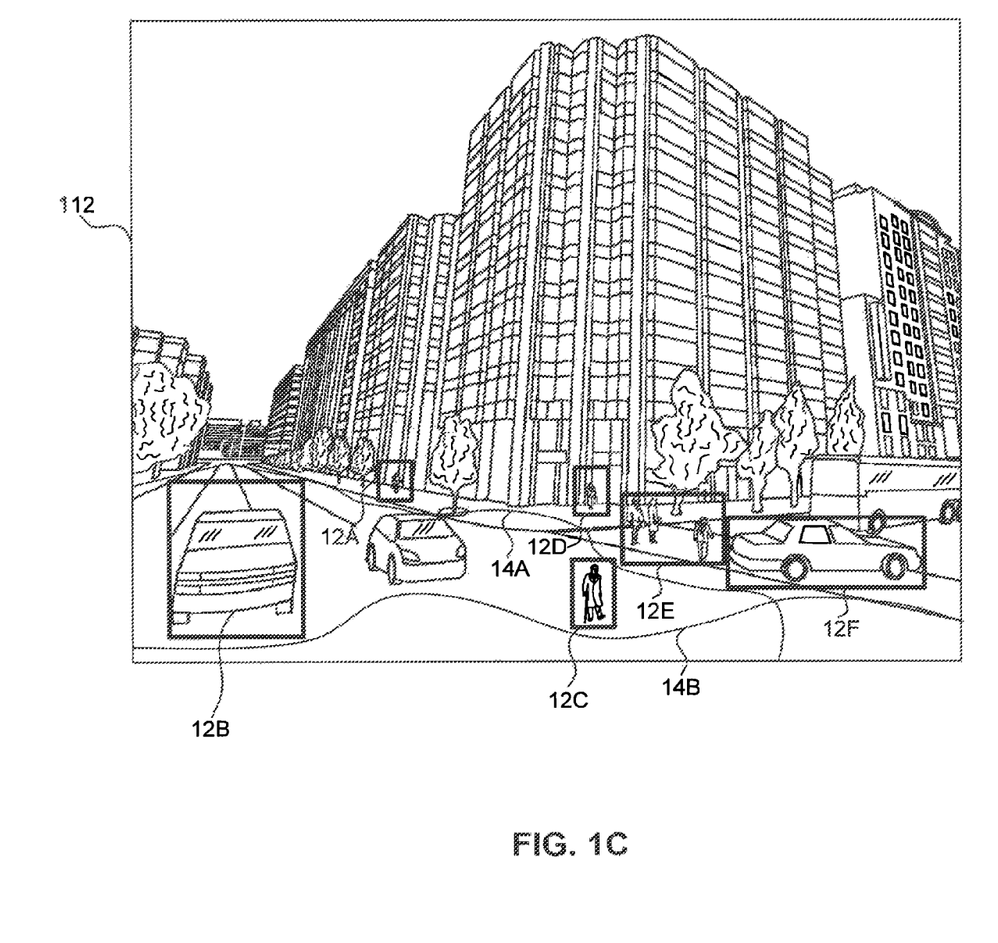

In an embodiment, a virtual path is generated for a 3D album. FIG. 1C includes virtual paths 14A and 14B, respectively through photographs 12A-F. The virtual path allows other users to view all or portions of the 3D album and the included 2D images. Virtual paths are further described below.

In another embodiment, a user who is an owner of the 3D album may configure multiple virtual paths for viewing the 3D album. Each virtual path may be associated with a level of access that the owner of the 3D album wishes to grant to other users. Levels of access may correspond, for example only and not by way of limitation, to family, friend, stranger, public and private. For example, virtual path 14A corresponds to a family access level, whereas virtual path 14B corresponds to a stranger level. When a user receives access to the 3D album from an owner, the user is able to use his client device to view the 3D album using the virtual path configured to the access level associated with that user. For example, if the user's access level is that of a family, the user views photographs included in virtual path 14A. However, if the user's level of access is that of a stranger, the user views photographs included in virtual path 14B.

Figure 1D:
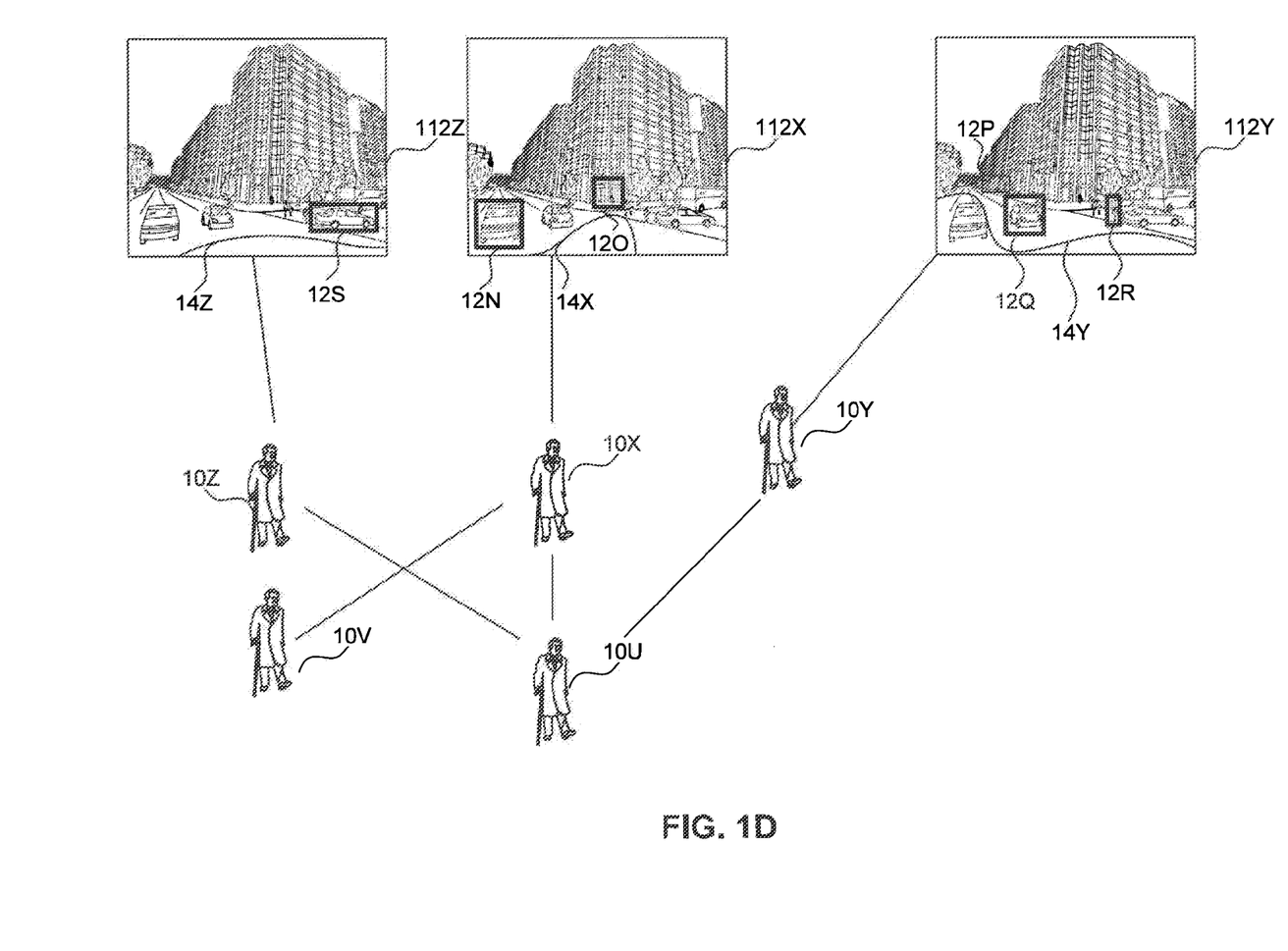

In an embodiment, 3D albums may be distributed to users based on a social graph of an owner of an album. For example, a user 10U may have users 10X, 10Y, and 10Z in his social graph. Each of the users 10X, 10Y, and 10Z owns a 3D album that includes the 3D environment 112 depicted in FIG. 1A. FIG. 1D illustrates a graph of users 10X, 10Y, and 10Z that are socially related to user 10U via a social graph 16A. 3D album 112X includes photographs 12N and 12O. 3D album 112Y includes photographs 12P, 12Q and 12R. 3D album 112Z includes photograph 12S.

3D albums 112X, 112Y and 112Z includes virtual paths 14X, 14Y and 14Z respectively for viewing the photographs. For example, user 10U may view photographs 12N-12O using virtual path 14X, photographs 12P-R using virtual path 14Y and photograph 1125 using virtual path 14Z. In an embodiment, user 10U may transition seamlessly among virtual paths 14X-Z.

In another embodiment, user 10V may be related to users 10X and 10Z, but not user 10Y via a social graph, such as graph 16B. In this embodiment, user 10V may access 3D albums 112X and 112Z and view photographs 12N-O and 12S, but not the photographs in 3D album 112Y.

Further description of embodiments for generating, distributing and viewing the 3D albums is provided below.

Example System Embodiments

Figure 2A:
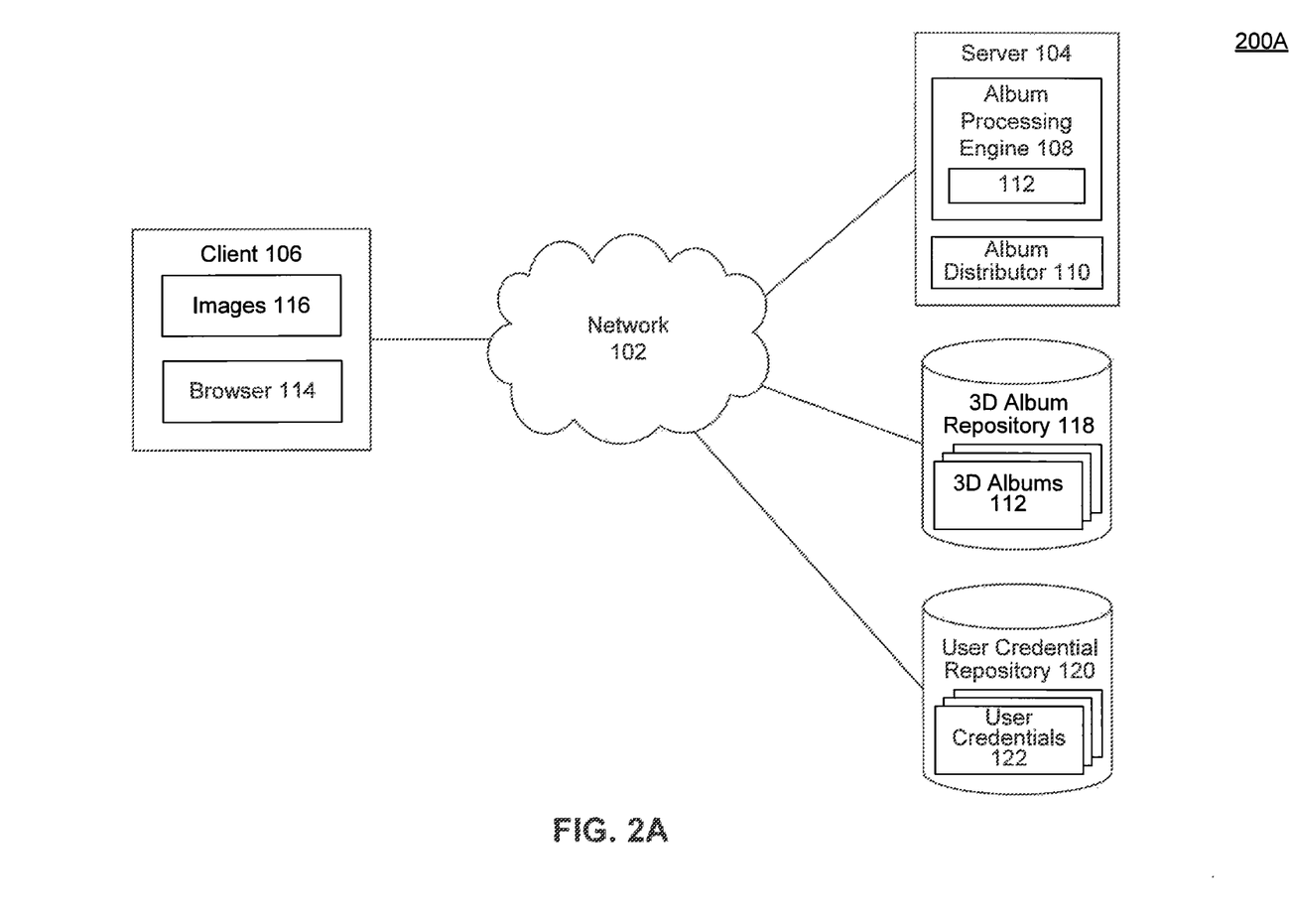
FIG. 2A is a block diagram of a client-server environment, according to an embodiment.

FIG. 2A is a block diagram of environment 200A, according to an embodiment. Environment 100 includes a network 102, a server 104 and a client device 106.

Network 102 may be any network or combination of networks that can carry data communication. Network 102 may include, but is not limited to, a local area network, metropolitan area network, and/or wide area network such as the Internet. Network 102 can support technologies including, but not limited to, the World Wide Web ("the Web") that provide access to services and applications using protocols, such as a HyperText Transfer Protocol ("HTTP"). Intermediate web servers, gateways, or other servers may be provided between components of the system shown in FIG. 2A, depending upon a particular application or environment.

Server 104 is a computing device that hosts multiple resources and applications. Server 104 may be a web server that hosts websites and transmits resources to one or more client devices 106. Server 104 may also retrieve resources from other computing devices or databases and provide resources to client device 106. Example resources may include any data that can be provided over network 102. A resource is identified by a resource address, such as a Uniform Resource Locator ("URL") that is associated with the resource. Resources include web pages, such as HyperText Markup Language (HTML) pages, scripts, word processing documents, portable document format (PDF) documents, images, and video, to name only a few. Resources can also include content, such as words, phrases, images and sounds, that may include embedded information (such as meta-information in hyperlinks) and/or embedded instructions (such as JavaScript scripts).

In an embodiment, there may be multiple servers 104 in environment 100.

In an embodiment, server 104 includes an album processing engine 108. Album processing engine 108 may be a standalone application that executes on server 104 or a plug-in for a browser executing on client device 106. In an embodiment where album processing engine 108 executes on server 104, client device 106 is able to access album processing engine 108 over network 102. In an embodiment where album processing engine 108 is, for example, a plug-in for a browser, album processing engine 108 is downloaded and installed on client device 106. In another embodiment, album processing engine 108 may include components in both server 104 and client device 106.

Album processing engine 108 generates three-dimensional (3D) albums from two-dimensional images. Details for generating a 3D album are described in FIG. 2B.

Server 104 also includes an album distributor 110. Album distributor 110 may also be a standalone application that executes on server 104 or a plug-in for a browser executing on client device 106. In an embodiment, album distributor 110 may be included in album processing engine 108 (not shown). Album distributor 110 distributes 3D albums 112 generated by album processing engine 108 to multiple client devices 106, as described in detail in relation to FIG. 3.

Client device 106 is an electronic device that is controlled and/or manipulated by a user. Client device 106 is capable of requesting and receiving resources, applications, browser plug-ins, etc., over network 102. Example client devices 106 include personal computers, laptop computers, smartphones, and tablet computers, digital cameras, televisions, and any other electronic device that can be used to view and/or modify images, to name only a few.

Client device 106 may include an application, such as a web browser (or simply "browser") 114. Browser 114 is used to request resources over network 102. For example, a user requests a resource by typing, selecting or entering an identifier (such as a URL) of a resource stored on server 104. In response to a request, server 104 transmits a resource to client device 106. In an embodiment where album processing engine 108 and/or album distributor 110 executes on server 104, browser 114 may access album processing engine 108 or album distributor 110 using a URL.

In an embodiment where album processing engine 108 or album distributor 110 is a plug-in in browser 114, client device 106 may install album processing engine 108 or album distributor 110 as plug-ins in browser 114.

In an embodiment, client device 106 is equipped with a digital camera for taking photographs and/or videos, also referred to as images 116. In another embodiment, a user may also upload images 116 using a portable memory device or download images 116 to client device 106 using network 102. In another embodiment, images 116 may be photographs that were manipulated using graphics editing programs or other similar tools. In another embodiment, images 116 may also include panoramic photographs. A person skilled in the art will appreciate that panoramic photographs may be created by stitching and/or overlaying several photographs to provide an appearance of a single photograph. In another embodiment, images 116 may also include photographs that were created using high dynamic range imaging (also referred to as HDR or HDRI). A person skilled in the art will appreciate that HDR photographs may be obtained by taking multiple photographs of the same image at different exposures, and then merging or overlaying the multiple photographs into a single photograph (the HDR photograph.)

Images 116 are two-dimensional images that may include photographs that are taken by a user of real-world locations. Images 116 may also be created by a user drawing, painting, texturing, and modifying an already created image or a combination of images using software known to a person of ordinary skill in the art. In an embodiment, images 116 may be photographs of real-world locations that a user has taken as he traveled around the world. In another embodiment, images 116 may include images to be shared by a user, as well as images to be shared with a subset of other users, or images not to be shared.

Images 116 may also be personalized images. In an embodiment, personalized images may be images 116 that are owned by a particular user. In another embodiment, personalized images 116 may be images of or depicting a particular user or a group of users, images of a particular user at a particular real-world location, images created by a particular user, etc.

In an embodiment, a user may use album processing engine 108 to generate 3D albums 112 that include images 116. For example, client device 106 provides two-dimensional images 116 to album processing engine 108. Album processing engine 108 may then integrate the provided images 116 with 3D imagery and generate 3D album 112.

A 3D album repository 118 stores 3D albums 112. 3D album repository 118 communicates with album processing engine 108 that generates 3D albums 112, 3D album distributor 110 that distributes 3D albums 112 and/or with any client device 106 or server 104 that requests, generates and transmits 3D albums 112. In an embodiment, 3D album repository 118 is a database or another non-volatile storage designed for storing large quantities of data, such as storage that is described in detail in FIG. 6. 3D album repository 118 may be included on a computing device that communicates with server 104 and/or client device 106 over network 102. In another embodiment (not shown), 3D album repository 118 may be included in server 104.

A user credential repository 120 stores user credentials 122. User credentials 122 are credentials that are specific to a user using album processing engine 108 and album distributor 110. Example user credentials 122 include a user identifier that is specific to a user. The user identifier identifies a user to album processing engine 108 or album distributor 110. A user identifier may be configured by generating a name/password combination for a user who accesses album processing engine 108 or album distributor 110. For example, user credentials 122 may include a username and password used by a user, who is an owner of 3D album 112 to access one or more of album processing engine 108, album distributor 110 or 3D album repository 118. In another embodiment, user credentials 122 may include a user identifier of an owner of 3D album 112 on another resource provider used by the owner of 3D album 112 to communicate with other users over network 102. Example resource providers may include user email applications or social networking services.

In an embodiment, user credentials 112 may also be associated with client device 106. For example, album processing engine 108 and album distributor 110 may identify the user based on the client device 106 used to access album processing engine 108 and/or album distributor 110.

User credentials 122 may also include a social graph of the user. In an embodiment, the social graph may be a listing of users that are related to a particular user. Considering a particular owner of a 3D album, one or more other users may determined to be related to the owner of the album based upon relationship and/or connections derived from social media, such as LinkedIn®, Facebook and the like, email services, short messaging or chat services and the like. The social graph may include a level of access of each user to the information provided by a particular user. Example levels of access may correspond to a family, friend, stranger, public and private to name a few.

Figure 6:
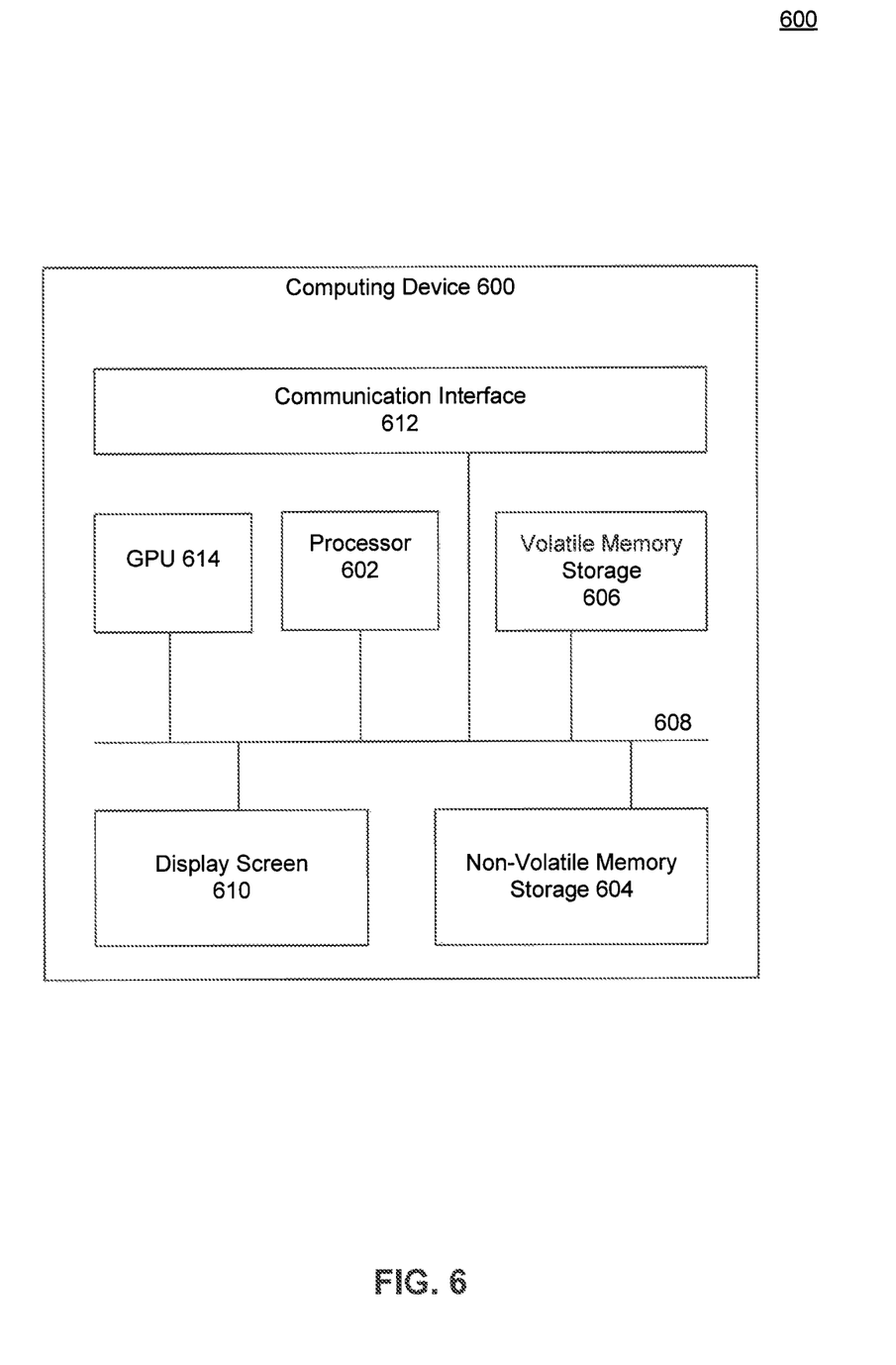
FIG. 6 is a block diagram of a computer system in which embodiments can be implemented.

In an embodiment, user credential repository 120 is a database or another non-volatile storage described in relation to FIG. 6. User credential repository 120 may be included on a computing device that communicates with server 104 and/or client device 106 over network 102. In another embodiment (not shown), user credential repository 120 may be included in server 104.

Figure 2B:
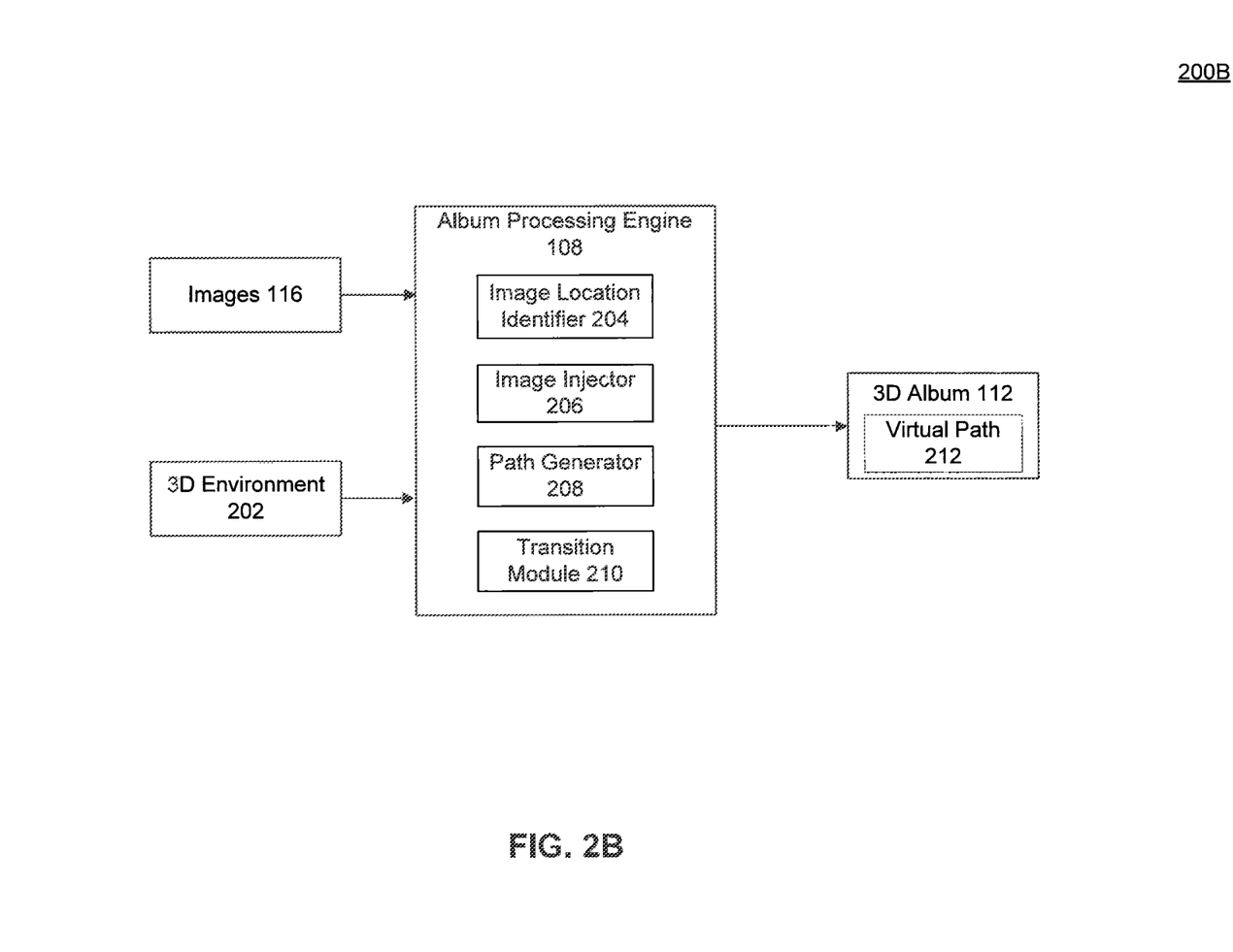
FIG. 2B is a block diagram of an album processing engine, according to an embodiment.

FIG. 2B is a block diagram 200B of an album processing engine, according to an embodiment.

In one embodiment, album processing engine 108 receives images 116 from client device 106. Images 116 may be uploaded by a user to client device 106, as described above. In one embodiment, uploaded images 116 are transmitted over network 102 to album processing engine 108. In another embodiment that includes album processing engine 108 on client device 106, images 116 are uploaded directly to album processing engine 108.

In an embodiment, client device 106 submits credentials 122 of a user to album processing engine 108. Album processing engine 108 then uses user credentials 122 to associate the user with a portion of or all of images 116 and 3D albums 112 that are generated using those images 116.

In an embodiment, to generate 3D album 112, album processing engine 108 combines images 116 with a 3D environment 202. 3D environment 202 includes data that generates one or more 3D models from two-dimensional images. In another embodiment, 3D environment 202 may be formed by a plurality of 360 degree panoramas that are connected together, where each 360 panorama is in the form of a sphere or a spheroid. In an embodiment, 3D models may be compilations of two-dimensional images that represent a real-world location in a 3D space such as 3D environment 302.

Those 3D models may be generated according to methods known to a person of ordinary skill in the art, or may be obtained from a third party vendor. In one example, a 3D model may be created using a point cloud textured with two-dimensional images. A point cloud may be generated by a 3D scanner that shoots laser beams at multiple points of one or more objects depicted in the 3D model. The generated point cloud includes data about the position of a point of each object and its distance to the 3D scanner. When the point cloud is generated, the point cloud may be overlaid or textured with multiple images, such as photographs, of the objects that the point cloud represents. The point cloud overlaid with images of the objects provides a 3D representation of the objects in a two-dimensional space. Multiple objects are then combined or stitched together into a 3D model.

In an embodiment, 3D environment 202 may be pre-generated for a user creating 3D album 112. For example, a user may be provided with 3D environment 202 by server 104 upon a request for environment having user-specified criteria. Example criteria may be, for example, geographic coordinates of a location, a city or a landmark. Some example 3D environments 202 may be environments that are similar to those provided by Google Street View and Google Earth.

In an embodiment, 3D album 112 includes images 116 that represent real-world locations. In 3D album 112, those images 116 of real-world location are incorporated into the 3D environment 202, for example by superimposing one of images 116 over an image of the same real-world location that is provided in 3D environment 202. In an embodiment, instead of superimposing image 116, image 116 may be inserted as a tag in the same location in 3D environment 202. When 3D album 112 is displayed on client device 106, the tag may open and present image 116.

Image location identifier 204 identifies the real-world location in images 116. As described herein, image 116 may be an image of a real-world location, such as an Eiffel Tower in Paris, France, Mount Rushmore in South Dakota, United States, Pyramids of Giza in Egypt, or Angkor Wat in Angkor, Cambodia. To identify the real-world location included in image 116, image location identifier 204 scans each image 116 for identifying landmarks or imagery. Image location identifier 204 may then use image reconstruction techniques to identify the dimensions of the images in each personalized image and compare them against the database of dimensions landmarks or other images. Generally, the methods for identifying a real-world location included in the image are known to a person of ordinary skill in the art.

In an embodiment, album processing engine 108 provides a user with an interface for entering a real-world location for images 116. For example, when image location identifier 204 is unable to identify a real-world location included in image 116, a user is presented with an interface for entering the real-world location. The interface allows a user to enter a real-world location using a country, city, a famous landmark, and latitude/longitude coordinates, to name a few examples.

When album processing engine 108 determines the real-world location, album processing engine 108 requests and receives 3D environment 202 that includes the identified real-world location.

In an embodiment, 3D environment 202 may include a plurality of 3D models. The plurality of 3D models allows a user to view the identified real-world location and the surrounding area. Also, when multiple real-world locations are identified in multiple images 116, album processing engine 108 retrieves 3D environment 202 that includes multiple 3D models of the identified locations. For example, when a user travels through Paris, France, user takes multiple photographs of an Eiffel Tower, the Louvre Museum, the Sacred-Heart Basilica of Montmartre and the Versailles Museum with a digital camera. Those photographs may be uploaded as images 116 to album processing engine 118. This may result in album processing engine 108 requesting 3D environment 202 that includes 3D models of each for the aforementioned real-world location.

Image injector 206 injects images 116 into 3D environment 202. For each image 116, image injector 206 identifies the real-world location in 3D environment 202 that is also included in image 116. To facilitate the identification, 3D environment 202 may include metadata that includes the latitude and longitude coordinates of the real-world locations included in the two-dimensional images that comprise 3D environment 202. In this embodiment, image injector 206 scans through the metadata associated with 3D environment 202 to identify the location in 3D environment 202 that corresponds to the location in image 116.

Once identified, image injector 206 incorporates image 116 into 3D environment 202. In one embodiment, when the location is identified, image injector 206 superimposes the two-dimensional image that includes the real-world location in 3D environment 202 with image 116. In another embodiment, image injector 206 may also adjust the zoom of the image 116 or a portion of image 116 in 3D environment 202, so that image 116 or a portion of image 116 fits into 3D environment 202 without obstructing other images. In yet another embodiment, image injector 206 injects a thumbnail into a location that may expand into image 116 when 3D album 112 is presented for viewing on client device 106.

In an embodiment, album processing engine 108 provides a user with an interface that inserts image 116 or a portion of image 116 into 3D environment 202. In one embodiment, the interface allows a user to drag and drop image 116 into 3D environment 202, allows a user to shrink or enlarge image 116 prior to insertion, and to modify the location or size of image 116 inserted into 3D environment 202 using image injector 206.

Path generator 208 generates a virtual path 212 through 3D album 112. Virtual path 212 passes by or through images 116 included in 3D album 112. Path generator 208 also generates a virtual camera that travels along the virtual path 212. Virtual path 212 may include a list of images and corresponding location coordinates in 3D environment 202. In an embodiment, virtual path 212 may be implemented using a labeled list or similar data structures. The virtual camera presents a user with a display of each image 116 that is included in virtual path 212. In an embodiment, path generator 208 may generate multiple virtual paths 212 through 3D album 112. For example, a user may set each image 116 to a different access level. Path generator 208 may then generate virtual path 212 that includes images 116 having a particular access level or a combination of access levels.

In an embodiment, album processing engine 108 presents a user with an interface where a user configures virtual path 212 and the position and orientation of the camera in 3D album 112. In another embodiment, user may configure the speed and zoom of the virtual camera as it travels virtual path 212.

Transition module 210 generates transitions between images as the virtual camera travels the virtual path 212. Example transitions are fading, palming, zooming in and out of images included in 3D image album 112. In an embodiment transition module 210 may generate transitions when a camera travels between different 3D models included in 3D album 112.

A user may be provided with an interface for viewing the 3D image album 112. In an embodiment, the interface allows a user to amend or change the virtual path 212 and the orientation and speed of the virtual camera as it traverses the virtual path 212. The interface also allows a user to remove or replace images 116 and to select additional images 116 for inclusion into 3D album 112.

A user may also be provided with an interface to store the generated 3D image album 112 on client device 106 or in 3D album repository 118.

Figure 3:
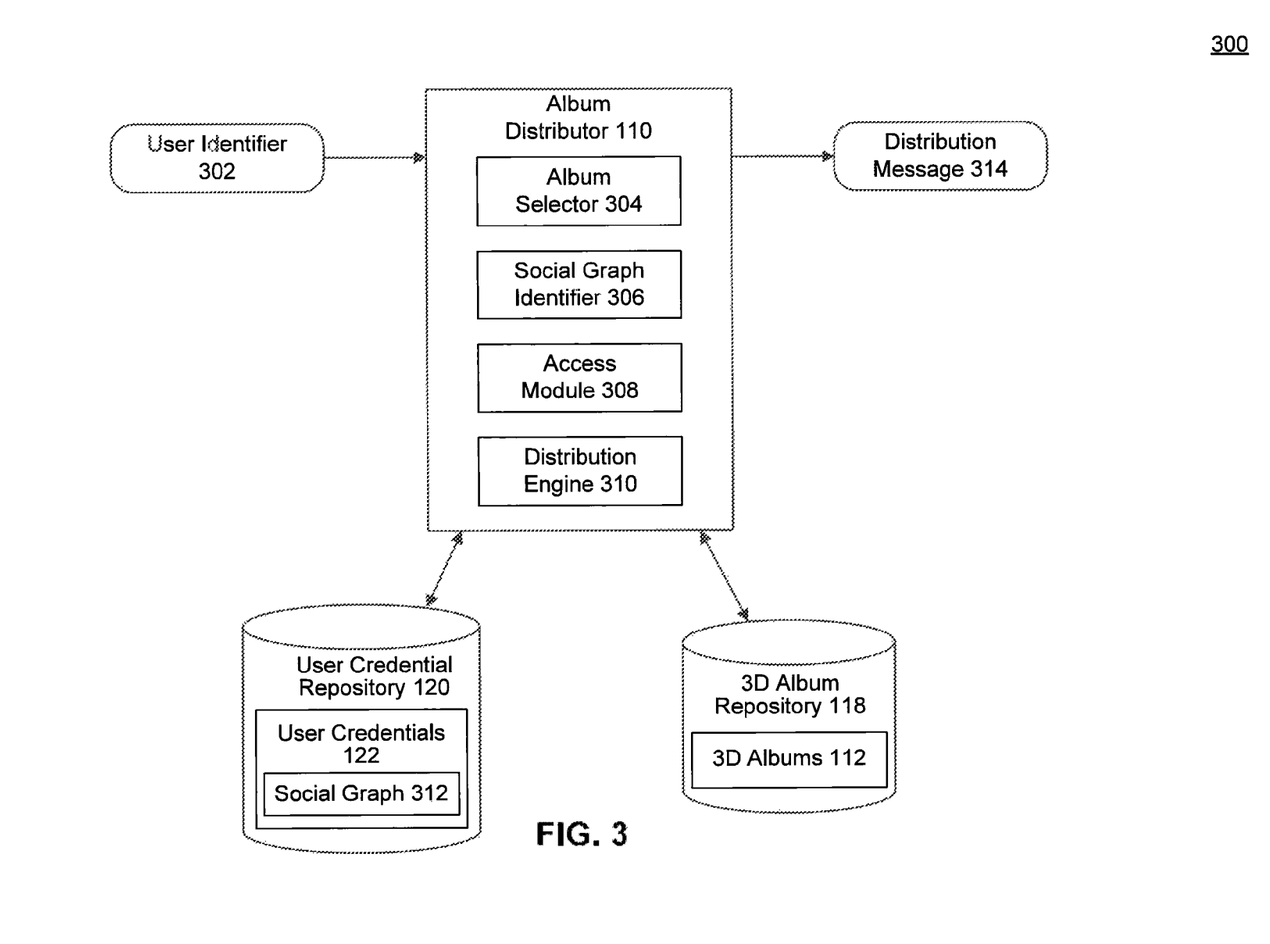
FIG. 3 is a block diagram of an album distributor, according to an embodiment.

FIG. 3 is a block diagram of an environment 300 for distributing 3D image albums 112, according to an embodiment. Album distributor 110 distributes 3D image albums 112 to multiple users using multiple client devices 106. As described above, album distributor 110 may be a standalone module or a plug-in for browser 114. In another embodiment, album distributor 110 may be included as a component of album processing engine 108 (not shown).

In an embodiment, album distributor 110 includes an interface for identifying the user. For example, a user may use browser 114 to access server 104 that hosts album distributor 110. To access album distributor 110, a user is provided with an interface that receives a user identifier 302. User identifier 302 identifies the user to album distributor 110. In another embodiment, a user enters a name and password combination that, once authenticated, enables album distributor 110 to associated user with user identifier 302 with a user.

Album distributor 110 includes an album selector 304, a social graph identifier 306, an access module 308 and a distribution engine 310. Album selector 304 identifies 3D albums 112 that are associated with user identifier 302. In one embodiment, album selector 304 queries 3D image repository 118 and identifies 3D albums 112 that are associated with user identifier 312. In another embodiment, a user may upload 3D album 112 to album distributor 110.

Social graph identifier 306 identifies one or more users that receive 3D album 112. In one embodiment, the users that receive access to 3D album 112 are identified based on the social graph of a user that generates 3D album 112.

In one embodiment, social graph identifier 306 identifies the social graph of a user based on a user identifier. For example, social graph identifier 306 queries user credential repository 120 for user credentials 122. The query may be user identifier 302 or criteria associated with user identifier 302 within album distributor 110. The query selects user credentials 122 that match user identifier 302 or the queried criteria.

As described herein, user credentials 122 include a social graph 312 of a user. Social graph 312 includes association of a user identified by user credentials 122 with multiple other users. In an embodiment, social graph 312 also includes a relationship between the user identified by user credentials 122 and multiple other users.

In an embodiment, the access level may be configured by the user.

Social graph identifier 306 identifies social graph 312 of a user. Album distributor 110 is able to distribute 3D album 112 identified by album selector 304 to one or more users in social graph 312.

Access module 308 allows a user to configure the access level of users in social graph 312 to 3D album 112. For example, users having a particular access level may view some or all images 116 in 3D album 112, based upon whether the particular access level is higher than the access level configured to the respective images.

In another embodiment, a user may use access module 308 to configure a particular virtual path in 3D album 112 to a particular access level of a user in social graph 312. For example, a user having an access level set to private, may view images 116 in virtual paths 212 in 3D album 112 that are designated for pubic and private viewing. On the other hand, a user having an access level set to public, may only view images 116 in virtual path 212 in 3D album 112 that are designated for public viewing.

Distribution engine 310 distributes 3D album 112 to users in social graph 312. In an embodiment, distribution engine 310 generates a distribution message 314 to each user that provides access to 3D album 112. Distribution message 314 may include an email address of the user in social graph 312 (also referred to as the viewing user) and an album access link. The album access link provides the viewing user with access to 3D album 112. In another embodiment, distribution message 312 may include a notification that 3D album 112 is available for viewing. In another embodiment, distribution message 314 includes an access code for accessing 3D album 112. A person skilled in the art will appreciate that the method for distributing and accessing 3D album 112 described above is given by way of example, and not limitation, and that other ways for distributing and accessing 3D album 112 may be used.

In an embodiment, distribution message 314 also includes an access level of each viewing user for viewing 3D album 112.

When a viewing user receives a distribution message 114, the viewing user uses distribution message 114 to view 3D album 112. To view 3D album 112, in one embodiment, the viewing user activates the access link using client device 106. Once activated, album distributor 110 receives an indication that a viewing user requests access to 3D album 112.

Upon receiving the indication, album distributor 110 causes album selector 304 to retrieve the 3D album 112 from 3D image repository 118 that corresponds to the access link. Album distributor 110 then presents 3D album 112 to client device 106 for viewing along with the determined access level. A viewing user uses client device 106 to view the presented 3D album 112 at the determined access level.

In an embodiment, where the access level for viewing 3D album is unavailable, social graph identifier 306 may determine the access level by identifying the user credentials 122 of the viewing user and the user who distributed 3D album 112. Based on user credentials 122 for the viewing and distributing users, access module 308 determines the access level that the viewing user has to 3D album 112.

In another embodiment, client device 106 accesses album distributor 110 in response to a request by a viewing user. In one embodiment, the viewing user uses browser 114 to type a web address of server 104 that hosts album distributor 110. In response, the viewing user may be presented with a login screen that requires the viewing user to enter login information or a user identifier. In yet another embodiment, client device 106 may be used to identify the viewing user.

Once album distributor receives a user identifier, album distributor 110 presents a user with a listing of 3D albums 112 to which the viewing user has access. For example, social graph identifier 306 identifies social graph 312 of a viewing user based on user credentials 122 that are associated with the viewing user. Based on social graph 312, social graph identifier 306 identifies user credentials 122 of other users in social graph 312.

Based on user credentials 122 of users in social graph 312, album selector 304 identifies 3D albums 112 that are associated with the users in social graph 312. When 3D albums 112 are identified, access module 308 determines whether the viewing user has an adequate access level to view some or all images 116 in each 3D album 112. Album distributor 110 then provides 3D albums 112 for which the viewing user has sufficient access to client device 106. In an embodiment, album distributor 110 provides access links to browser 114 on client device 106. Each access link is associated with 3D album 112 that a viewing user can access and view. The viewing user then uses browser 114 to activate the provided access link to view 3D album 112. When the link is activated, 3D album 112 is presented for viewing on client device 106.

When 3D album 112 is presented for viewing, the viewing user is presented with a tour through 3D album 112. The tour may be presented from a perspective of a camera that travels virtual path 212 configured in accordance with the viewing user's access level. Virtual path 212 may be through different 3D models included in 3D album 112 that present the viewing user with a virtual environment of a location, such as a real-world location included in 3D album 112. As the camera travels virtual path 212, the viewing user may be presented with images 116 that were incorporated into 3D album 112. To view images 116, the camera may slow down or zoom in to images 116 as configured by the creator of 3D album 112. In another embodiment, when the virtual camera approaches images 116, images 116 that are included as tags may open and display the content of the image 116. In yet another embodiment, the viewing user views images 116 that are included within any of a series of spheres or spheroids containing 360 degree panoramas.

Example Method Embodiments

Figure 4:
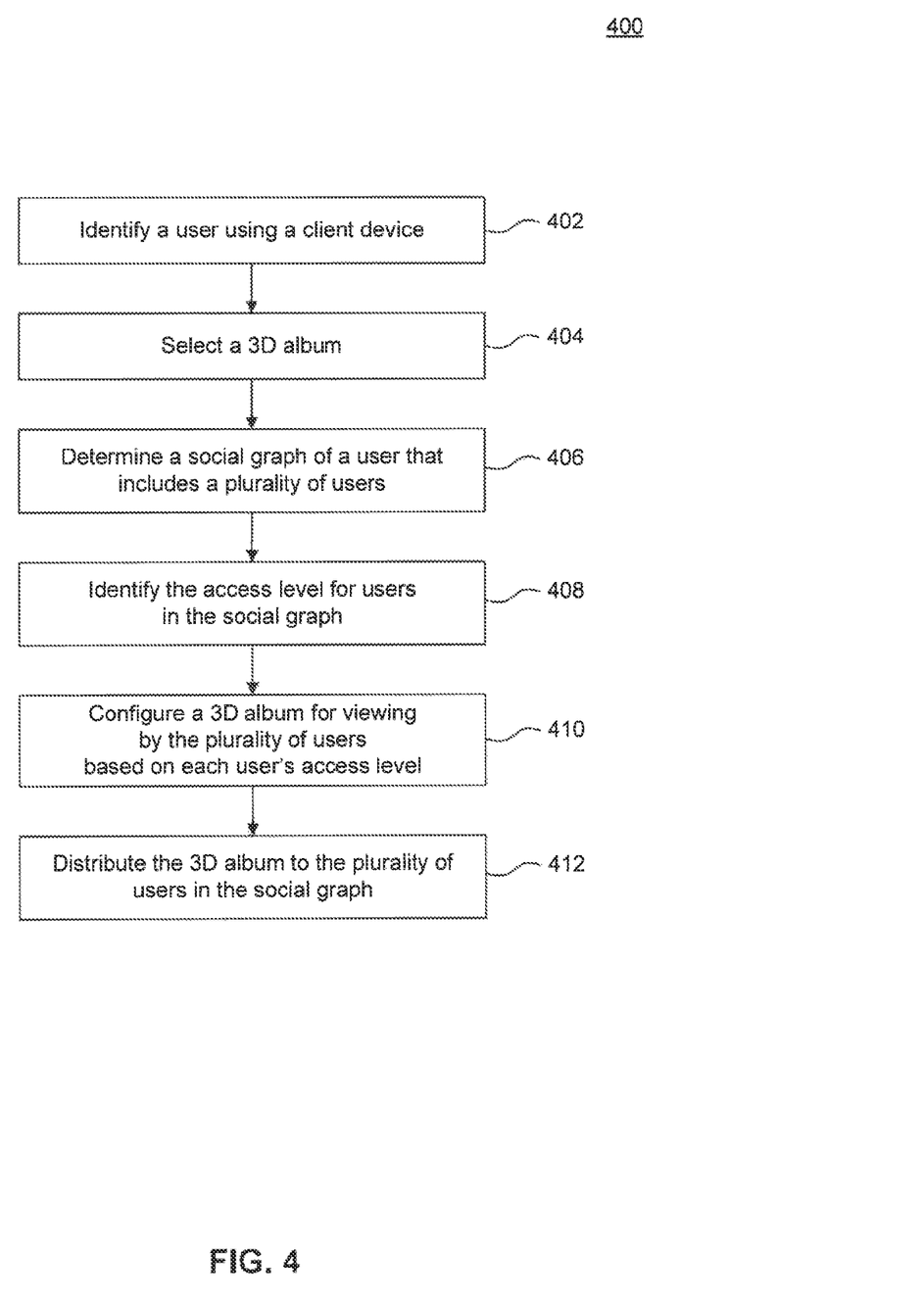
FIG. 4 is a flowchart for distributing a three-dimensional album, according to an embodiment.

FIG. 4 is a flowchart of a method 400 for distributing a 3D album, according to an embodiment. As described herein, prior to distributing 3D album 112, a user generates 3D album 112 using images 116 and album processing engine 108. 3D album 112 may be distributed to multiple users over network 102.

At stage 402, a user using a client device is identified. For example, a user uses client device 106 to access or generate 3D album 112. In one embodiment, a user accesses album distributor 110 using a login interface accessible using browser 114. The information provided to the login interface determines the user identifier of a user. Based on the user identifier, album distributor 110 identifies the user using client device 106.

At stage 404, a 3D album is selected. For example, album selector 304 receives an indication from a user for 3D album 112 that distribution engine 310 may distribute to other users.

At stage 406, a social graph of a user is determined. For example, social graph identifier 306 accesses user credential repository 120. Social graph identifier 306 uses a user identifier identified in stage 402 to retrieve user credentials 122 and the corresponding social graph 312 of a user.

At stage 408, an access level of each user in the social graph is identified. For example, access module 308 identifies an access level of each user in the social graph 312.

At stage 410, a 3D album is configured for viewing by some or all users in the social graph. For example, 3D album 112 may include multiple virtual paths 212, where each virtual path is associated with a particular access level. As described above, virtual path 212 may be modified to exclude image(s) 116 that the user does not wish to share with all users in social graph 312, but only with users having a particular access level. In this way, 3D album 112 may be presented for viewing to multiple users in a social graph 312, where the access of images 116 included in 3D album 112 is restricted based on the access level.

At stage 412, the 3D album is distributed to the users. For example, distribution engine 310 generates a distribution message 314 to users in the social graph 312. As described herein, the distribution message 314 includes access information for viewing 3D album 112.

Figure 5:
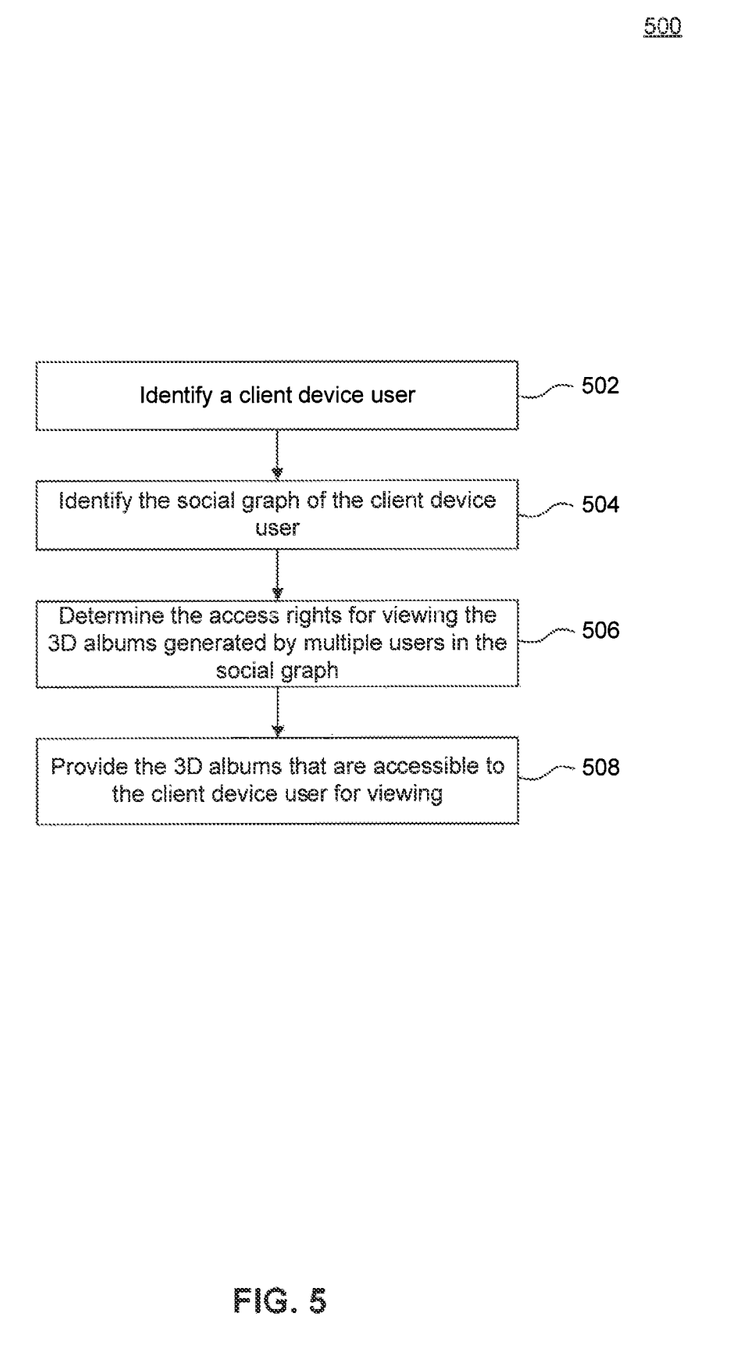
FIG. 5 is a flowchart for selecting a three-dimensional album for viewing, according to an embodiment.

FIG. 5 is a flowchart of a method 500 for viewing a 3D album, according to an embodiment. Prior to method 500, 3D album 112 was generated and was made accessible for viewing using client device 106.

At stage 502, a user of a client device is identified. For example, a viewing user uses client device 106 to access album distributor 110. The viewing user may use a login interface to access album distributor 110, by, for example, providing a user identifier to album distributor 110.

At stage 504, a social graph of a user is identified. For example, social graph identifier 306 queries user credential repository 120 for user credentials 122 that are associated with the user identifier of the viewing user. As described herein, user credentials 122 identify social graph 312 of the viewing user. Based on social graph 312 of the viewing user, social graph identifier 306 identifies users that are associated with the viewing user and have generated 3D albums 112.

At stage 506, access rights to viewing 3D albums generated by other users in the social graph are determined. For example, access module 308 determines the access level of the viewing user to 3D albums 112 generated by users in social graph 312 identified in stage 504.

At stage 508, 3D albums are provided to a viewing user. For example, album selector 304 generates a listing of 3D album 112 that are accessible to the viewing user. The listing may be provided to the viewing user using client device 106. The viewing user may then view the listing and request a particular 3D album 112 for presentation on client device 106 in accordance with the determined access level.

Example Computer System

FIG. 6 is an example computer system 600 in which embodiments of the present invention, or portions thereof, may be implemented as computer-readable code. For example, the components or modules of environment 100, such as album processing engine 108 and album distributor 110, browser 114, etc., may be implemented in one or more computer systems 600 using hardware, software, firmware, tangible computer-readable media having instructions stored thereon, or a combination thereof and may be implemented in one or more computer systems or other processing systems. Modules and components in FIGS. 2-5 may be embodied in hardware, software, or any combination thereof.

Client device 106, server 104, and other devices in image processing and display environment 100 may include one or more computing devices. Those computing devices may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices such as but not limited to, random access memory.

Communication infrastructure 608 may include one or more device interconnection buses such as Ethernet, Peripheral Component Interconnect (PCI), and the like.

Typically, computer instructions are executed using one or more processors 602 and/or one or more GPUs 614. Computer instructions can be stored in non-volatile storage medium 604 or memory devices 606. Computer instructions may be stored on a computing device in a compiled file, an executable file or dynamically linked libraries or objects. Computer instructions may also be compiled on a computing device prior to execution or interpreted on the computing device. In a non-limiting example, computer instructions may be included in a routine, a subroutine, or layers of a software stack that are manipulated by processors 602 or GPUs 614.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments may also be directed to computer program products comprising software stored on any computer-usable or computer-readable medium. Such software, when executed in one or more data processing device, causes a data processing device(s) to operate as described herein. Embodiments of the invention employ any computer-useable or readable medium. Examples of computer-readable mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method, using one or more computing devices, for viewing a three-dimensional (3D) environment, comprising:
    identifying, using one or more computing devices, a user based on a client device of the user;
    accessing, using one or more computing devices, a social graph associating the user and a plurality of other users;
    based on the social graph, determining, using one or more computing devices, a plurality of images associated with any one or more of the other users in the social graph, and determining an access level of the user;
    providing, using one or more computing devices, based on the user's access level, a set of the plurality of images, to the client device, wherein the provided images are associated with any one or more of the other users; and
    providing, using the one or more computing devices, data to the client device wherein the data enables the display of the provided images in the 3D environment at the client device, and the data further includes a virtual path in the 3D environment passing through or by the provided images at location coordinates in the 3D environment corresponding with locations associated with the provided images, and the provided virtual path is generated based on the user's access level.

2. The computer-implemented method of claim 1,
    wherein each of the images depicts a real-world location; and
    wherein the data for display of the provided images comprises data positioning each of the images at a location in the 3D environment corresponding to the depicted real-world location.

3. The computer-implemented method of claim 2, wherein the provided images are superimposed over an image in the 3D environment of the same real-world location.

4. The computer-implemented method of claim 1, wherein each of the images is a personalized photograph associated with one or more of the other users.

5. The computer-implemented method of claim 4, wherein the 3D environment is a 3D photo-album of at least one real-world location that incorporates personalized photographs of the one or more other users.

6. A system for viewing a three-dimensional (3D) environment, comprising:
    an album distributor comprising one or more computing devices, the album distributor configured to:
    identify a user based on the client device of the user;
    access a social graph associating the user and a plurality of other users;
    based on the social graph, determine a plurality of images associated with one or more of the other users in the social graph and determine an access level of the user; and
    provide, based on the user's access level, a set of the plurality of images and data to the client device, wherein the provided images are associated with any one or more of the other users, and the images;
    provide data to the client device wherein the data enables the display of the images in the 3D environment, and the data further includes a virtual path in the 3D environment passing through or by the provided images at location coordinates in the 3D environment corresponding with locations associated with the provided images, and the provided virtual path is generated based on the user's access level.

7. The system of claim 6, wherein each of the images depicts a real-world location; and
    wherein the album distributor is further configured to provide data for display of the images, wherein the data for display of the images comprises data positioning each of the image at a location in the 3D environment corresponding to the depicted real-world location.

8. The system of claim 7, wherein the 3D environment is a 3D photo-album of at least one real-world location that incorporates personalized photographs of the one or more other user.

9. The system of claim 7, wherein the album distributor is configured to provide the images superimposed over an image in the 3D environment of the same real-world location.

10. The system of claim 6, wherein each of the images is a personalized photograph associated with one or more of the other users.

11. A computer-implemented method for viewing a three-dimensional (3D) environment, comprising:

receiving a plurality of images and data for display of the images on a client device, in response to a request by a user using the client device, wherein the images and data are determined by a server in accordance with a social graph associating the user and a plurality of other users;

displaying the images in the 3D environment on the client device, the images which are displayed being based on an access level of the user and in accordance with a virtual path in the 3D environment passing through or by the displayed images at location coordinates in the 3D environment corresponding with location identifiers of respective displayed images, and the provided virtual path is generated based on the user's access level.

12. The computer-implemented method of claim 11, further comprising traversing the virtual path through the 3D environment.

13. The computer-implemented method of claim 11, wherein each of the displayed images depicts a real-world location; and wherein the data for display of the images comprises at least a portion of the data for positioning each of the images at a location in the 3D environment corresponding to the depicted real-world location.

14. The computer-implemented method of claim 11, wherein the images are displayed superimposed over an image in the 3D environment of the same real-world location.

15. The computer-implemented method of claim 11, wherein each of the images is a personalized photograph associated with one or more of the other users.

16. The computer-implemented method of claim 15, wherein the 3D environment is a 3D photo-album of at least one real-world location that incorporates personalized photographs of the one or more other users.

* * * * *